US012482926B2

(12) United States Patent
Xu et al.

(10) Patent No.: US 12,482,926 B2
(45) **Date of Patent: *Nov. 25, 2025**

(54) RADIATION ELEMENT AND BANDWIDTH EXTENSION STRUCTURE

(71) Applicant: RFS Technologies, Inc., Meriden, CT (US)

(72) Inventors: Jiankai Xu, Shanghai (CN); Ke Chen, Shanghai (CN); Chunhua Zhou, Shanghai (CN); Jing Liu, Shanghai (CN); Jihong Sun, Shanghai (CN)

(73) Assignee: RFS Technologies, Inc., Meriden, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,204

(22) Filed: Apr. 3, 2024

(65) Prior Publication Data

US 2024/0372256 A1 Nov. 7, 2024

Related U.S. Application Data

(63) Continuation of application No. 16/758,762, filed as application No. PCT/CN2018/113679 on Nov. 2, 2018, now Pat. No. 11,984,666.

(30) Foreign Application Priority Data

Nov. 9, 2017 (CN) ......................... 201711098031.5

(51) Int. Cl.
*H01Q 1/24* (2006.01)
*H01Q 5/392* (2015.01)
*H01Q 21/26* (2006.01)

(52) U.S. Cl.
CPC ............ *H01Q 1/246* (2013.01); *H01Q 5/392* (2015.01); *H01Q 21/26* (2013.01)

(58) Field of Classification Search
CPC ......... H01Q 1/246; H01Q 5/307; H01Q 21/26
See application file for complete search history.

(56) References Cited

U.S. PATENT DOCUMENTS 3,653,053 A 3/1972 St. Vrain et al.
6,542,128 B1 * 4/2003 Johnson .................. H01Q 9/28 343/826

(Continued)

FOREIGN PATENT DOCUMENTS

CN 201845866 U * 5/2011 ............ H01Q 21/26
CN 103036073 A 4/2013

(Continued)

OTHER PUBLICATIONS

International Search Report for International Application No. PCT/CN2018/113679 mailed Jan. 30, 2019.

(Continued)

*Primary Examiner* — Daniel Munoz
(74) *Attorney, Agent, or Firm* — Myers Bigel, P.A.

(57) ABSTRACT

According to an aspect of the present disclosure, a radiation element is provided, comprising: a basic radiation element and one or more bandwidth extension structures; wherein the one or more bandwidth extension structures are mounted on the basic radiation element to extend the operating bandwidth of the basic radiation element. The present disclosure has the following advantages: the radiation element according to the present disclosure has one or more bandwidth extension structures to extend the operating bandwidth of the basic radiation element, such that by combining the plurality of bandwidth extension structures and the basic radiation element, the radiation element may work well at bands beyond its original operating band, which eliminates (Continued)

the need of using a plurality of basic radiation elements due to different operating bandwidths as required, thereby saving costs.

20 Claims, 5 Drawing Sheets

(56) References Cited

U.S. PATENT DOCUMENTS

| | | | |
|---|---|---|---|
| 11,984,666 | B2 | 5/2024 | Xu et al. |
| 2005/0253769 | A1 | 11/2005 | Timofeev et al. |
| 2007/0254587 | A1 | 11/2007 | Schadler et al. |
| 2009/0128442 | A1 | 5/2009 | Fujita et al. |
| 2012/0268326 | A1 | 10/2012 | Kai et al. |
| 2015/0194739 | A1 | 7/2015 | Chen et al. |
| 2016/0248161 | A1 | 8/2016 | Ziv |
| 2018/0331419 | A1* | 11/2018 | Varnoosfaderani .... H01Q 13/10 |
| 2021/0184352 | A1 | 6/2021 | Xu et al. |

FOREIGN PATENT DOCUMENTS

| | | | |
|---|---|---|---|
| CN | 103872435 | A | 6/2014 |
| CN | 205752538 | U | 11/2016 |
| CN | 205985337 | U | 2/2017 |
| CN | 207381521 | U | 5/2018 |

OTHER PUBLICATIONS

International Preliminary Report on Patentability for International Application No. PCT/CN2018/113679 mailed May 22, 2020.

Extended European Search Report for European Application No. 18875825.4 dated Jul. 19, 2021.

* cited by examiner

RADIATION ELEMENT AND BANDWIDTH EXTENSION STRUCTURE

CROSS-REFERENCE TO RELATED APPLICATIONS

This Application is a continuation claiming the benefit under 35 U.S.C. § 120 of U.S. patent application Ser. No. 16/758,762, filed on Apr. 23, 2020, entitled "RADIATION ELEMENT AND BANDWIDTH EXTENSION STRUCTURE," which is a national stage filing under 35 U.S.C. § 371 of International Patent Application Serial No. PCT/CN2018/113679, filed on Nov. 2, 2018, entitled "RADIATION ELEMENT AND BANDWIDTH EXTENSION STRUCTURE," which claims priority to and the benefit of Chinese Patent Application Serial No. 201711098031.5, filed on Nov. 9, 2017.

TECHNICAL FIELD

The present disclosure relates to the field of communication technologies, and more particularly to a radiation element and a bandwidth extension structure.

BACKGROUND

Radiation element is an element constituting an antenna basic structure. At present, high gain radiation element could not work well in broadband. It is very difficult to match in broadband with current radiation element. Mismatched radiation element will cause the amplitude and phase distribution inconsistency, so the radiation pattern will deform during the broad frequency band. Especially the radiation side lobe which is not suppressed well will lead to the interference between two adjacent base stations.

The best existing solution is to design different radiation elements for different frequency band. The radiation element can only work in its certain corresponding frequency band, and cannot work in a wider band. If required frequency band changes, a new radiation element have to be designed to match it. Otherwise, the radiation patterns or the voltage standing wave ratio will get worse.

SUMMARY

An object of the present disclosure is to provide a radiation element and a bandwidth extension structure.

According to an aspect of the present disclosure, a radiation element is provided, comprising: a basic radiation element and one or more bandwidth extension structures;

wherein the one or more bandwidth extension structures are mounted on the basic radiation element to extend the operating bandwidth of the basic radiation element.

According to another aspect of the present disclosure, a bandwidth extension structure is provided, wherein the bandwidth extension structure is mounted on a basic radiation element to extend the operating band of the basic radiation element.

According to a further aspect of the present disclosure, an antenna device is provided, comprising a radiation element according to the present disclosure.

According to a still further aspect of the present disclosure, a method for manufacturing a bandwidth extension structure is provided, comprising steps of:

determining the shape and the size of a to-be-manufactured bandwidth extension structure based on the size of the basic radiation element and the operating band that needs to be extended.

manufacturing the corresponding bandwidth extension structure based on the determined shape and size.

Compared with the prior art, the present disclosure has the following advantages: the radiation element according to the present disclosure has one or more bandwidth extension structures to extend the operating bandwidth of the basic radiation element, such that by combining the plurality of bandwidth extension structures and the basic radiation element, the radiation element may work well at bands beyond its original operating band, which eliminates the need of using a plurality of basic radiation elements due to different operating bandwidths as required, thereby saving costs.

BRIEF DESCRIPTION OF THE ACCOMPANYING DRAWINGS

Other features, objectives and advantages of the present disclosure will become more apparent through reading the detailed description of the non-limiting embodiments with reference to the accompanying drawings.

In the accompanying drawings, same or similar reference numerals represent same or like components.

DETAILED DESCRIPTION OF THE PREFERRED EMBODIMENTS

Hereinafter, the present disclosure will be described in further detail with reference to the accompanying drawings.

The radiation element according to the present disclosure comprises a basic radiation element and one or more bandwidth extension structure.

Specifically, the radiation element is provided in an antenna device of a base station, the base station including, but not limited to a macro base station, a micro base station, and a home base station, etc.

Specifically, the one or more bandwidth extension structures are mounted on the basic radiation element to extend an operating bandwidth of the basic radiation element.

Preferably, the bandwidth extension structure is mounted on a radiation arm of the basic radiation element, the size of the bandwidth extension structure being adapted to the size of the radiation arm.

Preferably, there are one or more mounting holes on the radiation arm, to fasten the bandwidth extension structure on the basic radiation element. For example, the bandwidth extension structure may be fastened to the basic radiation element through the mounting hole of the radiation arm using a plastic rivet.

Preferably, the radiation unit further comprises an insulation structure located between the bandwidth extension structure and the basic radiation element to thereby prevent direct contact between the bandwidth extension structure and the basic radiation element.

Specifically, the insulation structure may adopt various kinds of insulation materials, e.g., plastic or resin, etc.

It needs to be noted that those skilled in the art should appreciate that a plurality of ways may be adopted to mount the bandwidth extension structure onto the basic radiation element, not limited to the above manner of mounting the bandwidth extension structure onto the basic radiation element through the mounting hole in the radiation arm. Those skilled in the art may select an appropriate manner to adhere the bandwidth extension structure onto the basic radiation element based on actual needs.

Specifically, the bandwidth extension structure according to the present disclosure is mounted on the basic radiation element to extend the operating band of the basic radiation element.

Preferably, there are one or more mounting holes on the radiation arm, to fasten the bandwidth extension structure on the basic radiation element.

Preferably, the bandwidth extension structure is a U-shaped or L-shaped metal plate.

Figure 1:
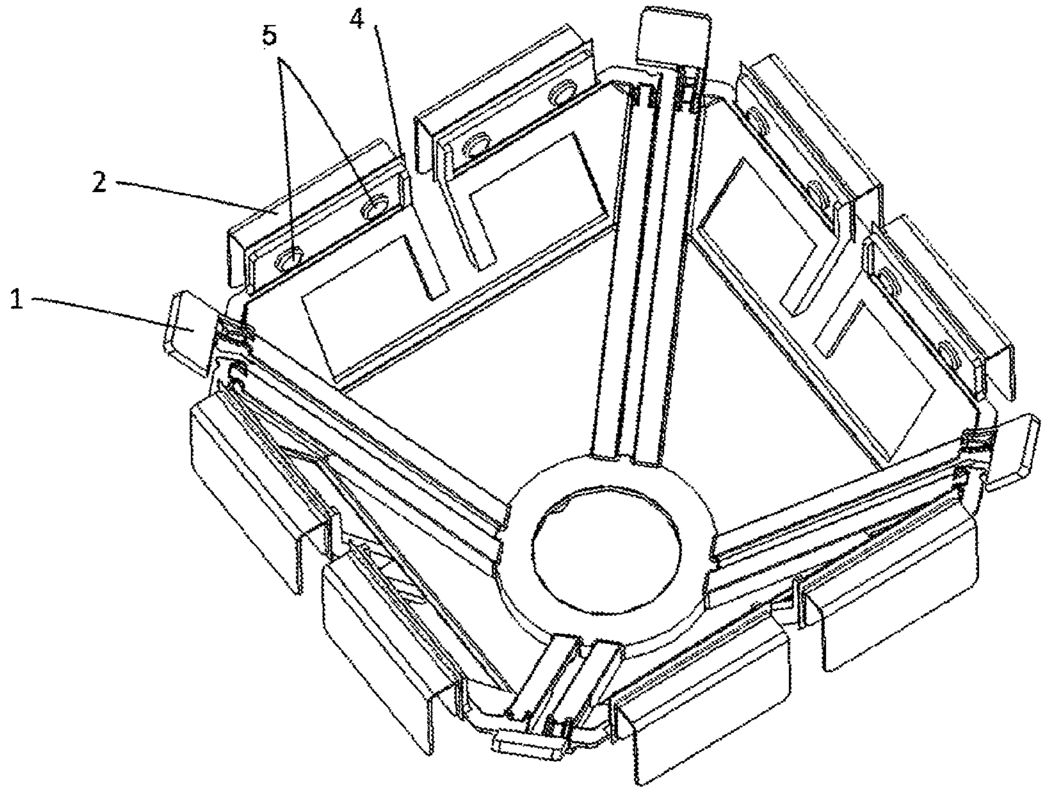
FIG. 1 shows a structural schematic diagram of an exemplary radiation element according to the present disclosure.
Figure 2:
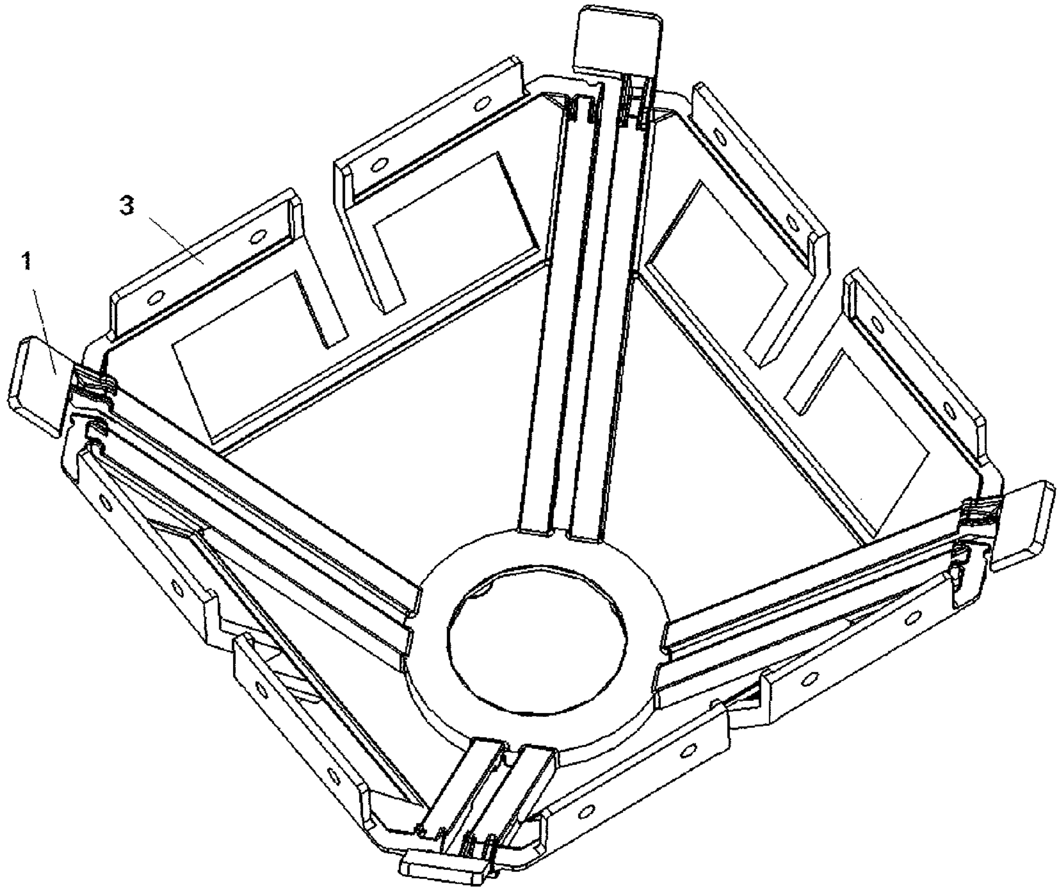
FIG. 2 shows a structural schematic diagram of an exemplary basic radiation element according to the present disclosure.
Figure 3:
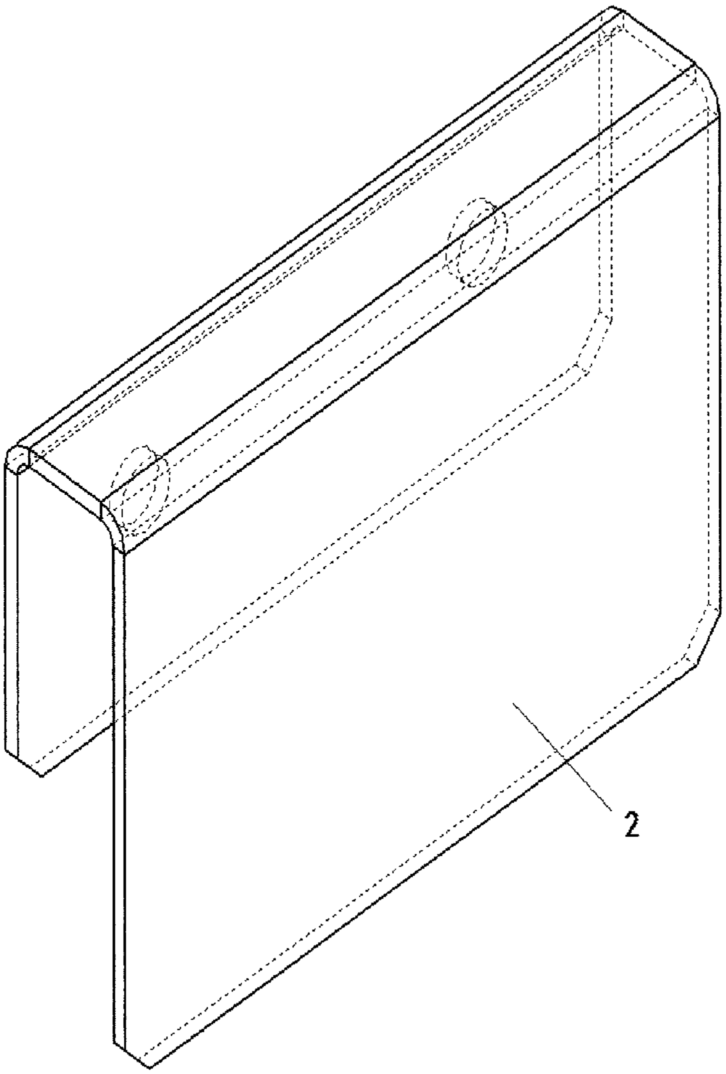
FIG. 3 shows a structural schematic diagram of an exemplary bandwidth extension structure according to the present disclosure.

FIG. 1 to FIG. 3 shows the structural schematic diagrams of an exemplary radiation element, an exemplary basic radiation unit, and an exemplary bandwidth extension structure according to the present disclosure, respectively.

With reference to FIG. 1 to FIGS. 3, the radiation element shown in FIG. 1 comprises one basic radiation element 1 as shown in FIG. 2 and eight bandwidth extension structures 2 as shown in FIG. 3.

The bandwidth extension structure 2 is a U-shaped metal plate mounted on the basic radiation element 1, to extend the operating band of the basic radiation element from band 690-960 MHz to band 600-960 MHz.

The bandwidth extension structure 2 is mounted on the radiation arm 3 of the basic radiation element 1, the size of the bandwidth extension structure being adapted to the size of the radiation arm. Two mounting holes are provided on each radiation arm, as shown in FIG. 2. Moreover, two mounting holes are provided for each bandwidth extension structure 2, as shown in FIG. 3. With reference to FIG. 1, the bandwidth extension structure 2 is fastened onto the basic radiation element 1 via the mounting hole using a plastic rivet 5.

The radiation element further comprises an insulation structure 4 that is an insulative diaphragm of plastic. The insulation structure 4 is located between the bandwidth extension structure 2 and the basic radiation element 1 to prevent direct contact between the bandwidth extension structure 2 and the basic radiation element 1.

Figure 4:
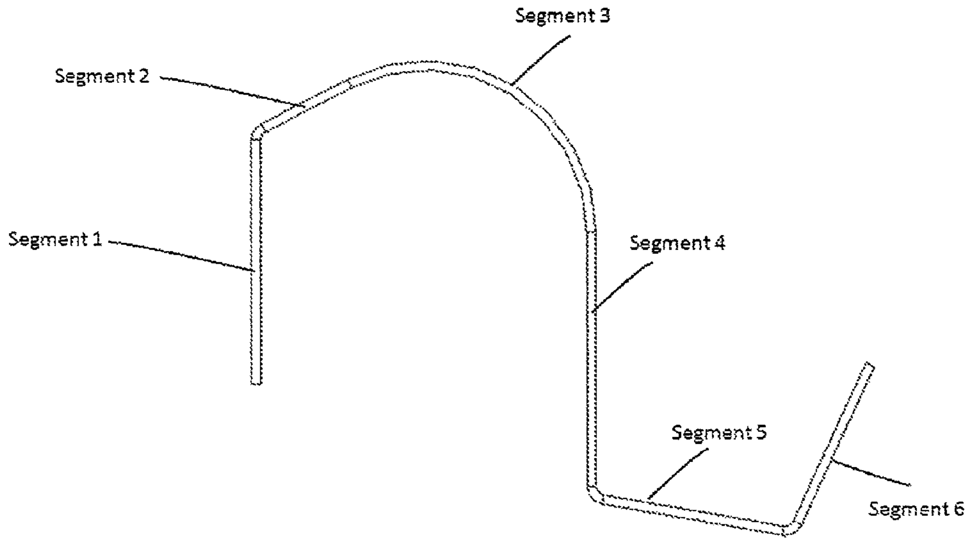
FIG. 4 shows a side view of an exemplary bandwidth extension structure according to the present disclosure.

FIG. 4 schematically shows a side view of an exemplary bandwidth extension structure according to the present disclosure.

With reference to FIG. 4, the bandwidth extension structure comprises six segments, segment 1 to segment 6. The side of each segment of the bandwidth extension structure may be straight or curved, and two segments of the bandwidth extension structure may be formed at any angle. The front of the bandwidth extension structure may be any shape, to be adapted to basic radiation elements of different shapes.

The radiation element of the present disclosure has one or more bandwidth extension structures to extend the operating bandwidth of the basic radiation element, such that by combining the plurality of bandwidth extension structures and the basic radiation element, the radiation element may work well at bands beyond its original operating band, which eliminates the need of using a plurality of basic radiation elements due to different operating bandwidths as required, thereby saving costs.

Figure 5:
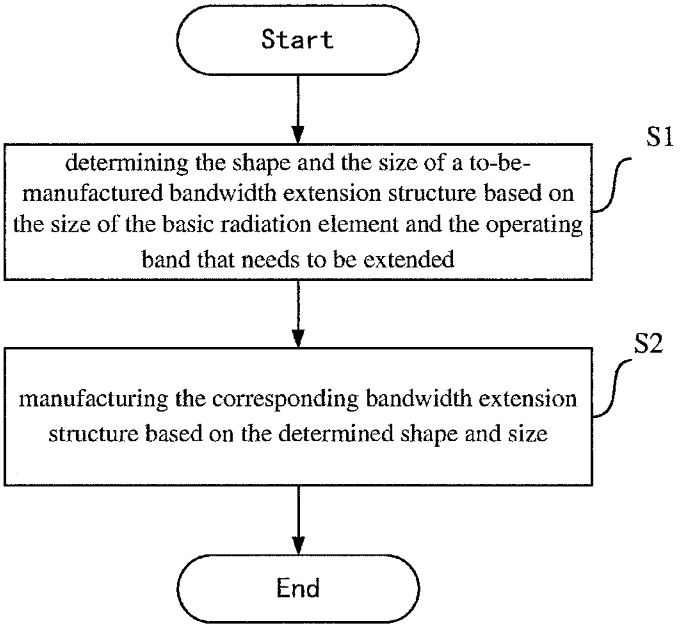
FIG. 5 shows a flow diagram of a method for manufacturing a bandwidth extension structure according to the present disclosure.

FIG. 5 schematically shows a flow diagram of a method for manufacturing a bandwidth extension structure according to the present disclosure. The method comprises step S1 and step S2.

With reference to FIG. 5, in step S1, the shape and the size of a to-be-manufactured bandwidth extension structure is determined based on the size of the basic radiation element and the operating band that needs to be extended.

In step S2, the corresponding bandwidth extension structure is manufactured based on the determined shape and size.

For example, with reference to FIGS. 2 and 3, to manufacture a U-shaped bandwidth extension structure of FIG. 3 adapted to the basic radiation element shown in FIG. 2, supposing the bandwidth to be extended is f, then the size of the bandwidth extension structure is determined based on the size of the radiation arm of the basic radiation unit, and the width of the U-shaped opening of the U-shaped bandwidth extension structure is determined based on f, thereby manufacturing the corresponding bandwidth extension structure.

According to the method of the present disclosure, the operating bandwidth of the basic radiation unit is extended by manufacturing a bandwidth extension structure, such that by combining the plurality of bandwidth extension structures and the basic radiation element, the radiation element may work well at bands beyond its original operating band, which eliminates the need of using a plurality of basic radiation elements due to different operating bandwidths as required, thereby saving costs.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative. The scope of the present disclosure is limited by the appended claims, not by the description above; therefore, meanings of equivalent elements within the scope and all variations within the scope intend to be included in the present disclosure. No reference numerals in the claims should be regarded to limit the relevant claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. An antenna device, comprising:

a plurality of radiating arms;

a plurality of metal plates that comprise angled segments, wherein the plurality of metal plates are mounted on the plurality of radiating arms, respectively, and are conductively separate from ground; and a plurality of insulation structures respectively located between the plurality of metal plates and the plurality of radiating arms and configured to provide capacitive coupling between the plurality of metal plates and the plurality of radiating arms, respectively, and inhibit conductive coupling between the plurality of metal plates and the plurality of radiating arms, respectively.

2. The antenna device of claim 1, wherein the plurality of metal plates are mounted on the plurality of radiating arms, respectively, with plastic rivets.

3. The antenna device of claim 2, wherein each of the plurality of radiating arms comprises one or more mounting holes configured to receive the plastic rivets to fasten the respective metal plate on the radiating arm.

4. The antenna device of claim 1, wherein the plurality of metal plates are U-shaped or L-shaped.

5. The antenna device of claim 4, wherein each of the plurality of metal plates has a U-shape and an opening separating portions of the U-shape, a width of the opening configured to provide a difference in bandwidth between the plurality of radiating arms with the plurality of metal plates mounted thereon and without the plurality of metal plates mounted thereon.

6. The antenna device of claim 1, wherein the plurality of metal plates are conductively separate from each of the plurality of radiating arms.

7. The antenna device of claim 1, wherein the plurality of radiating arms are configured to operate over a larger bandwidth with capacitive coupling from the plurality of radiating arms to the plurality of metal plates, respectively, than without capacitive coupling from the plurality of radiating arms to the plurality of metal plates, respectively.

8. A base station comprising the antenna device of claim 1.

9. An antenna device, comprising:

a radiating arm;

a conductive plate with angled segments; and an insulation structure comprising an insulative structure, wherein:

the radiating arm is configured for capacitively coupling to the conductive plate via the insulative structure;

the insulative structure is configured to inhibit conductive coupling between the radiating arm and the conductive plate; and the conductive plate is electrically separate from ground.

10. The antenna device of claim 9, wherein the insulative structure comprises an insulative diaphragm.

11. The antenna device of claim 9, wherein the conductive plate is U-shaped or L-shaped.

12. The antenna device of claim 9, wherein the angled segments comprise a first segment and a second segment spaced apart by a distance configured to provide a difference in bandwidth between the radiating arm with capacitive coupling to the conductive plate and the radiating arm without capacitive coupling to the conductive plate.

13. The antenna device of claim 9, wherein the conductive plate is mounted to the radiating arm with a plastic rivet.

14. The antenna device of claim 9, wherein the radiating arm is configured to operate over a larger bandwidth with capacitive coupling to the conductive plate than without capacitive coupling to the conductive plate.

15. A base station comprising the antenna device of claim 9.

16. A method of manufacturing an antenna device, the method comprising:

mounting a metal plate, having angled segments, on a radiating arm of the antenna device with an insulation structure between the metal plate and the radiating arm to provide capacitive coupling between the metal plate and the radiating arm and to inhibit conductive coupling between the radiating arm and the metal plate, the metal plate having angled segments and being conductively separate from ground.

17. The method of claim 16, wherein mounting the metal plate on the radiating arm comprises using plastic rivets.

18. The method of claim 17, further comprising fastening the metal plate on the radiating arm by inserting the plastic rivets into one or more mounting holes of the radiating arm.

19. The method of claim 16, wherein the antenna device comprises a plurality of radiating arms, and the method comprises mounting, on each of the plurality of radiating arms, a respective metal plate having angled segments, with a respective insulation structure between the respective metal plate and the radiating arm to provide capacitive coupling between the metal plate and the radiating arm and to inhibit conductive coupling between the radiating arm and the metal plate, the metal plate having angled segments and being conductively separate from ground.

20. The method of claim 16, wherein the metal plate is U-shaped or L-shaped.

* * * * *